United States Patent [19]

Hoshino et al.

[11] 4,171,218
[45] Oct. 16, 1979

[54] ANTICORROSIVE BELLOWS

[75] Inventors: Taiji Hoshino, Tokyo; Masao Okubo; Masayoshi Miki, both of Niihama, all of Japan

[73] Assignee: Sumitomo Chemical Company, Limited, Osaka, Japan

[21] Appl. No.: 907,345

[22] Filed: May 18, 1978

[30] Foreign Application Priority Data

May 23, 1977 [JP] Japan .................................. 52/60266

[51] Int. Cl.$^2$ .......................... F16J 3/04; C22C 38/02; C22C 38/48; C22C 38/50
[52] U.S. Cl. .................................. 75/128 C; 29/454; 72/54; 75/128 G; 75/128 Z; 113/116 B
[58] Field of Search ............ 75/128 G, 128 C, 128 Z; 29/454; 113/116 B; 72/54

[56] References Cited

U.S. PATENT DOCUMENTS

| | | | |
|---|---|---|---|
| 2,225,730 | 12/1940 | Armstrong | 75/128 C |
| 2,920,954 | 1/1960 | Mott | 75/128 G |
| 2,984,563 | 5/1961 | Tanczyn | 75/128 C |
| 3,429,160 | 2/1969 | Banks | 113/116 B |
| 3,615,368 | 10/1971 | Baumel | 75/128 C |
| 4,000,984 | 1/1977 | Baumel | 75/128 C |
| 4,108,641 | 8/1978 | Fujioka et al. | 75/128 C |

FOREIGN PATENT DOCUMENTS 758009 9/1956 United Kingdom ................. 75/128 C

*Primary Examiner*—Arthur J. Steiner
*Attorney, Agent, or Firm*—Stevens, Davis, Miller & Mosher

[57] ABSTRACT

An anticorrosive bellows made of stainless steel containing 0.10% by weight or less of C, 2.5–5% by weight of Si, 2% by weight or less of Mn, 15–20% by weight of Cr, 10–22% by weight of Ni, 10 times or more as much as the C content but at most 2.5% by weight of at least one element selected from the group consisting of Ta and Zr, and the remainder consisiting substantially of Fe shows excellent corrosion resistance even under strongly corrosive circumstances, e.g. fuming or concentrated nitric acid. Said stainless steel has improved workability, weldability and endurance and the produced bellows can be used as a bellows valve, a bellows joint, and the like.

3 Claims, No Drawings

ANTICORROSIVE BELLOWS

This invention relates to bellows having excellent corrosion resistance.

Flexible parts such as bellows type valves and bellows type joints are exposed to severe fatigue rupture conditions by repeated stress during the usage. Particularly if they are used under corrosive circumstances, their lives are forced to be shortened due to cumulative influence of a corrosion factor in addition to the repeated stress. One example is a flexible bellows which treats a strongly corrosive solution accompanied by the generation of harmful gas such as fuming nitric acid, concentrated nitric acid, a mixed acid, or the like. Valves which are used for this purpose are required to prevent leakage of such harmful gases during opening and shutting of the valves. But no suitable bellows material for producing bellows valves used for such a purpose has been found since the valves are used under such severe conditions. For example, stainless steel including as high-class stainless steel such as Hastelloy B and C, Carpenter 20 does not show corrosion resistance to concentrated nitric acid; titanium provides various problems such as ignition and stress corrosion cracking due to fuming nitric acid; tantalum and zirconium show sufficient corrosion resistance but they are so poor in yield strength that they cannot satisfy the mechanical requirements of bellows and further there is an economical problem in using them since they are very expensive. On the other hand, anticorrosive materials such as high-silicon cast iron and glass cannot be used for making bellows having thin and complicated forms.

Thus, properties required for the materials for making bellows to be used under the conditions as mentioned above are toughness capable of standing excessively repeated stress, and in addition thereto, excellent corrosion resistance capable of resisting severe corrosive circumstances, as well as high extrusion cold workability and excellent weldability capable of making bellows having thin and complicated forms. No materials having such properties as mentioned above have been found theretofore.

It is an object of this invention to provide bellows having excellent corrosion resistance made of materials having the properties as mentioned above.

This invention provides an anticorrosive bellows made of stainless steel containing 0.10% by weight or less of C, 2.5-5% by weight of Si, 2% by weight or less of Mn, 15-20% by weight of Cr, 10-22% by weight of Ni, 10 times or more as much as the C content but at most 2.5% by weight of at least one element selected from the group consisting of Ta, Zr and a mixture of Nb with Ta or/and Zr, and the remainder consisting substantially of Fe.

The material used for producing bellows of this invention has high cold workability and excellent weldability. Further the bellows of this invention is by far superior in durability to a conventional one made of ordinary steel, and still further it can satisfactorily be used under corrosive circumstances mentioned above.

The material for making bellows of this invention should have the following components:

Carbon (C): The carbon content being as low as possible is desirable from the viewpoint of corrosion resistance, but on the other hand, a higher carbon content is preferable from the viewpoint of mechanical requirements of bellows. In the stainless steel used in this invention, the conflicting requirements are resolved by concomitant inclusion of at least one element selected from the group consisting of Ta and Zr, wherein a part of Ta or/and Zr may be supplemented by Nb. In other words, by the coexistence of at least one element defined above, carbon can be allowed to be present in an amount of 0.1% by weight at most in the stainless steel without producing unfavorable influence on corrosion resistance. This is a characteristic feature of the present invention. If the carbon content is more than 0.1% by weight, the amount of at least one element defined above should also increase, which results in lowering of cleanliness of the steel, deterioration of corrosion resistance, and increase of hardness together with lowering of workability. Therefore, the upper limit of carbon should be 0.1% by weight.

Si: Silicon is a major component which provides corrosion resistance and high elasticity as bellows and the minimal amount of it is 2.5% by weight from the viewpoint of corrosion resistance. Since an excess amount of silicon makes the material brittle and lowers workability and weldability, the amount of silicon is limited to 2.5-5% by weight.

Cr: In order to maintain corrosion resistance, 15% by weight or more of chromium is necessary. But if the chromium content is more than 20% by weight, by the coexistence of Si, a large amount of ferrite is deposited to form a two-phase structure, which lowers workability and accelerates sigma phase embrittlement. Therefore the amount of chromium is limited to 15-20% by weight.

Ni: Nickel is necessary to maintain the structure as austenite containing a small amount of ferrite balanced with the amounts of Cr, Si, and Ta or/and Zr and partially supplemental Nb and to improve workability, weldability and fatigue endurance. The amount of nickel is limited to 10-22% by weight.

At least one element selected from the group consisting of Ta and Zr: Stabilizing effect can be obtained in the amount of 10 times or more as much as the carbon content. But if the amount is more than 2.5% by weight, the inclusions increase to lower workability and to lower fatigue life due to stress concentration at such inclusions. Therefore the amount is limited to from 10×(the carbon content) to 2.5% by weight.

Mn: Manganese is added to contribute to austenitization balanced with the amounts of Si, Cr and Ta or/and Zr and partially supplemental Nb, and is also added as a deoxidizer. Since an excess amount of Mn lowers corrosion resistance, the upper limit of Mn is limited to 2% by weight.

The bellows of this invention shows excellent durability not only in general use but also in use under strongly corrosive circumstances, e.g. with concentrated nitric acid, for which conventional bellows cannot be used, or other strongly corrosive acids.

For example, the degree of corrosion of the bellows of this invention when treated at 650° C. for 2 hours to make the material sensitive is as follows: 0.006 g/m²·hour under red fuming nitric acid (78% by weight HNO$_3$, 18% by weight N$_2$O$_4$, and 3% by weight H$_2$O) at 30° C., 0.01 g/m²·hour under fuming sulfuric acid at 30° C., 0.002 g/m²·hour under nitrosylsulfuric acid at 30° C., and 0.004 g/m²·hour under mixed acid (66% by weight HNO$_3$, 33% by weight H$_2$SO$_4$, and 1% by weight H$_2$O) at 40° C. These results show that the bellows of this invention has excellent corrosion resistance under strongly corrosive circumstances.

As mentioned above, the bellows of this invention has excellent durability and can also be used under strongly corrosive circumstances, e.g. with strongly corrosive acids such as concentrated nitric acid, fuming nitric acid, fuming sulfuric acid, mixed acid and the like, which can generate harmful gases.

Thus, the bellows of this invention shows excellent effects on safety and preservation of environment and is very useful industrially.

This invention is explained in more detail by way of the following examples, but it is not limited to the details thereof.

The chemical compositions of samples used in the working examples are shown in Table 1. Each sample was prepared by forging 1–10 kg of ingot produced in a high-frequency electric furnace, forming a steel plate of 2 mm thick via a cold rolling procedure, subjecting to heat treatment at 1100° C. for 15 minutes and air-cooled. Some of the samples were formed into the desired bellows through cold extrusion process as mentioned hereinafter.

Table 1

| Sample No. | C | Si | Mn | Cr | Ni | Nb | Ta | Zr |
|---|---|---|---|---|---|---|---|---|
| | | | | (% by weight) | | | | |
| 1 | 0.02 | 1.93 | 1.21 | 17.67 | 14.11 | | 0.41 | |
| 2 | 0.01 | 6.01 | 1.24 | 18.00 | 14.04 | 0.20 | 0.05 | |
| 3 | 0.01 | 4.02 | 1.24 | 17.65 | 8.88 | | 0.32 | |
| 4 | 0.02 | 3.92 | 1.24 | 25.26 | 20.12 | | 0.44 | |
| 5 | 0.15 | 4.30 | 1.23 | 17.07 | 14.11 | 1.05 | | 1.90 |
| 6 | 0.02 | 4.01 | 1.25 | 17.58 | 14.11 | | | |
| 7 | 0.08 | 4.00 | 1.21 | 17.17 | 13.92 | 0.59 | | |
| 8 | 0.03 | 3.82 | 1.27 | 17.07 | 13.71 | 2.84 | | |
| 9 | 0.03 | 4.04 | 1.05 | 17.44 | 13.86 | 0.79 | 0.04 | |
| 10 | 0.09 | 4.04 | 1.20 | 17.09 | 13.97 | 0.98 | 0.06 | |
| 11 | 0.02 | 3.94 | 1.26 | 17.19 | 13.81 | | 0.57 | |
| 12 | 0.03 | 3.98 | 1.21 | 16.47 | 13.45 | | | 0.47 |
| 13 | 0.03 | 3.88 | 1.13 | 16.75 | 13.82 | 0.70 | 0.75 | |
| 14 | 0.03 | 4.00 | 1.18 | 16.93 | 14.11 | 1.04 | | 0.65 |
| 15 | 0.03 | 3.99 | 1.22 | 17.01 | 14.08 | | 0.70 | 0.68 |

(Note)
1: Steels of Sample Nos. 1–8 are for comparison.
Steels of Sample Nos. 9–15 are within the scope of the present invention.
2: The remainder of the composition is Fe in all the samples.

EXAMPLE 1

Sheet workability from ingot to each steel plate of 2 mm thickness and hardness of the plate were compared among Sample Nos. 2, 3, 4, 5, 9 and 11. The results are as shown in Table 2.

Table 2

| Sample No. | Hardness (Hv) | Sheet Workability | Note |
|---|---|---|---|
| 2 | 309 | Cracks were generated during hot working | Comparison |
| 3 | 274 | Cracks were generated during cold working | " |
| 4 | 270 | Cracks were generated during cold working | " |
| 5 | 250 | Cracks were generated during cold working | " |
| 9 | 165 | Good in both hot and cold working | The present invention |
| 11 | 160 | Good in both hot and cold working | " |

(Note)
Hardness was measured according to Vickers, 30 kg load.

As is clear from Table 2, the steel plates outside the scope of the present invention show higher values in hardness than those of the present invention and have problems in sheet workability. On the other hand, the steels within the scope of the present invention can be worked without causing any troubles.

EXAMPLE 2

Using Sample No. 9, a bellows was made by the following procedures:

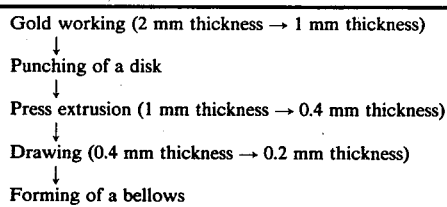

Gold working (2 mm thickness → 1 mm thickness)
↓
Punching of a disk
↓
Press extrusion (1 mm thickness → 0.4 mm thickness)
↓
Drawing (0.4 mm thickness → 0.2 mm thickness)
↓
Forming of a bellows The steel according to this invention was able to stand cold working under such severe conditions without any troubles and showed good weldability to flanges. Particularly, as to weld zones, since fluidity of the deposited metal was good due to high Si content in the steel used in this invention, a heap of excess metal over the weld zones can be reduced remarkably. This feature is a very desirable property for this application which should avoid changes in thickness in order to stabilize the performancy as a bellows.

EXAMPLE 3

Bellows obtained by the process of Example 2 were compared with those made of a conventional steel (SUS 316L) in durability under the conditions as listed in Table 3 by adding load repeatedly with compression and tension. The results are as shown in Table 3.

Table 3

| Sample | Number of cycles at repeated stress | Size of a bellows | Endurance test condition |
|---|---|---|---|
| SUS 316L | (1)* 88,200 | Outer diameter: 37 mm φ | Amount of extenstion and compression: 17% against free length (extension 40%, compression 60%) Cycles: 36 times/min. Outer pressure: 10 kg/cm² G |
| | (2)* 96,300 | Inner diameter: 25.5 mm φ | |
| Steel of the present invention (Sample No. 9) | (1)* 220,400 | Thickness: 0.21 mm Type: U type Number of crest: 13 | |
| | (2)* 190,500 | | |

(Note)
*Run number.

As shown in Table 3, the steel used in this invention shows excellent durability more than two times as great as the conventional steel (SUS 316L) and can be used as excellent material for producing bellows.

EXAMPLE 4

Supposing the application in treating concentrated nitric acid, corrosion resistance against 98% nitric acid was tested. Each plate of Samples as listed in Table 4 was immersed in 98% HNO₃ for 24 hours at the boiling temperature and this procedure was repeated 5 batches. Each test plate had previously be subjected to solution heat treatment at 1100° C. for 15 minutes followed by air-cooling. Corrosion test was also carried out against sensitized materials by treating each sample at 650° C. for 2 hours followed by air-cooling taking weld heataffected zones into consideration. The results are as shown in Table 4.

Table 4

| Sample No. | Corrosion rate (g/m² · hour) | | | | Note |
|---|---|---|---|---|---|
| | Solution heat treated material | | Sensitized material | | |
| | In the liquid phase | In the gas phase | In the liquid phase | In the gas phase | |
| 1 | 2.39 | 4.53 | — | — | Comparison |
| 6 | 0.20 | 0.81 | 0.38 | 13.58 | " |
| 7 | 0.04 | 0.29 | 0.13 | 3.28 | " |
| 8 | 0.19 | 0.63 | 0.38 | 2.33 | " |
| 9 | 0.15 | 0.38 | 0.24 | 0.74 | The present invention |
| 10 | 0.02 | 0.27 | 0.07 | 0.62 | " |
| 11 | 0.06 | 0.31 | 0.07 | 0.48 | " |
| 12 | 0.05 | 0.63 | 0.04 | 0.72 | " |
| 13 | 0.12 | 0.62 | 0.14 | 1.02 | " |
| 14 | 0.06 | 0.62 | 0.04 | 1.06 | " |
| 15 | 0.08 | 0.61 | 0.09 | 0.75 | " |

As is clear from Table 4, the steels used in this invention are superior in corrosion resistance to those outside the scope of this invention.

EXAMPLE 5

A 1 inch nominal size bellows valve using the bellows produced in Example 2 was used for treating 98% nitric acid at room temperature. After the being used 19 months (the number of opening and shutting of the valve being 2100 times), the bellows was completely sound without corrosion or any damages.

The application of bellows to such an object as mentioned above has been impossible because of the absence of suitable materials which can bear up under such strongly corrosive circumstances. But this becomes possible by the present invention. In the case of treating such a solution as concentrated nitric acid which generates harmful $NO_2$ gas by leakage, it is desirable from the viewpoint of safety and preservation of the environment to use bellows valves and bellows joints having no fear of the leakage structurally and this becomes possible by the present invention.

What is claimed is:

1. An anticorrosive bellows made of stainless steel consisting essentially of 0.10% by weight or less of C, 2.5–5% by weight of Si, 2% by weight or less of Mn, 15–20% by weight of Cr, 10–22% by weight of Ni, 10 times or more as much as the C content but at most 2.5% by weight of at least one element selected from the group consisting of Ta, Zr and a mixture of Nb with Ta or/and Zr, and the remainder consisting substantially of Fe.

2. A bellows valve comprising the anticorrosive bellows according to claim 1.

3. A bellows joint made of the anticorrosive bellows according to claim 1.

* * * * *